Feb. 6, 1968  C. A. BRAUKMAN  3,367,681

SWIVEL FITTING

Filed Oct. 11, 1965

INVENTOR
Clarence A. Braukman
BY Ralph F. Crandell
ATTORNEY 3,367,681
SWIVEL FITTING
Clarence A. Braukman, Arvada, Colo., assignor to Screw Machine Products Co., Denver, Colo., a corporation of Colorado
Filed Oct. 11, 1965, Ser. No. 494,436
1 Claim. (Cl. 285—94)

ABSTRACT OF THE DISCLOSURE

The invention is a conduit fitting formed by a tubular body having at one end a smooth external sealing surface for receiving a rotatable head having a co-extensive internal smooth sealing surface and pair of spaced lubricant retaining O-rings between the body and the head. The body includes a nipple portion insertable into the end of a conduit and an external clamp is utilized for clamping the conduit to the nipple.

Background of the invention

The present invention relates to fittings for flexible conduit, such as yieldable resilient rubber and plastic hose or tubes, and more particularly to a fitting which enables the conduit or fitting to which it is attached to rotate or swivel about a fixed terminal.

Hose fittings of the type to which the present invention is applicable are shown in a variety of forms in U.S. Patents Nos. 2,871,738 and 3,106,758 and in pending application Serial No. 440,761, filed March 18, 1965 for Conduit Fittings and now Patent No. 3,333,871. Other well know fittings are, of course, applicable for use with the present invention.

Objects of the invention

The principal object of the present invention is to provide an improved fitting which includes a novel swivel assembly by means of which a hose conduit or nozzle to which the fitting is attached may be rotated with respect to a fixed terminal, pipe, hose, or other mounting.

A more specific object of the present invention is to provide an improved swivel fitting of the foregoing character which is adapted for use with highly penetrative fluids such as petroleum products and prevents leakage of such products through the fitting.

Another object of the present invention is to provide a swivel fitting assembly of the foregoing character which is adapted for use with fittings of a wide range of sizes and which may be adapted for use with any appropriate nipple and clamp assembly.

A further object of the present invention is to provide a swivel fitting of the above type which affords 360° rotation of the fitting without increasing the diameter or length of the fitting itself.

Still a further object of the present invention is to provide a swivel fitting assembly of the above character which is easily and simply manufactured, is inexpensive, and which affords a highly effective, leakproof, swivel arrangement.

Summary

Figure 1:
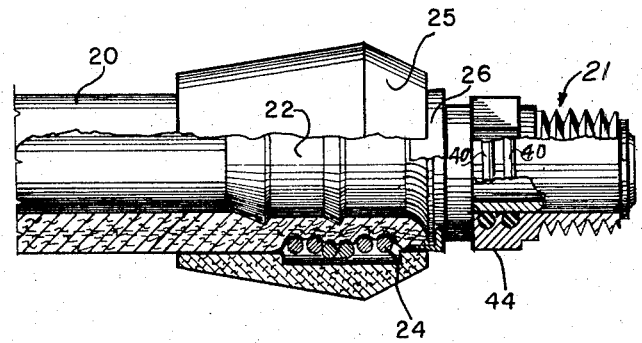
FIGURE 1 is an elevation view of a hose fitting and swivel assembly embodying the invention, with parts cut away for clarity.
Figure 2:
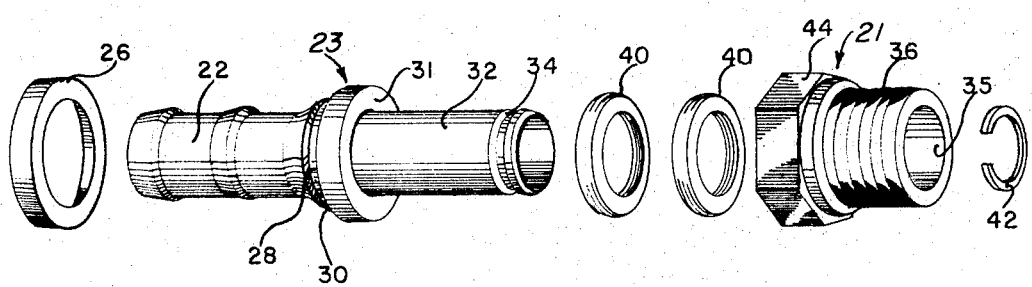
FIG. 2 is an exploded view of the fitting and swivel assembly shown in FIG. 1.
Figure 3:
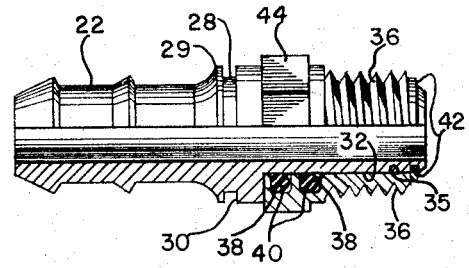
FIG. 3 is an elevation view of a portion of the fitting and swivel assembly shown in FIG. 1, with a portion of the fitting cut away to illustrate the organization in horizontal elevation section.

The present invention is embodied in a swivel fitting adapted to be engaged with one end of a flexible conduit. The fitting comprises a body having means attachable to the end of a conduit and carrying thereon a swivel head. The fitting body and head are provided with co-extensive smooth surfaces and a pair of spaced O-rings are provided between the surfaces to form a seal and retain lubricant. The head is secured to the fitting body by an appropriate clamp which prevents axial movement between the two parts.

Description of the preferred embodiment

The conduit fitting and swivel assembly shown in the drawing as illustrative of the present invention is adapted for use on either or both of the ends of a flexible conduit 20, such as a hose or conduit for carrying petroleum products, and is provided with an externally threaded end head 21, adapted to be secured to the end of a rigid mounting, pipe, fixture, or like terminal such as the outlet of a conventional gasoline pump (not shown), or to a nozzle (not shown). With the present invention the swivel fitting enables the conduit 20 to be rotated through a 360° rotation relative to the fixed pump or nozzle. To this end, the conduit 20 is securely affixed in fluid tight relation to the swival fitting assembly by an appropriate nipple and clamp device, one such suitable nipple and clamp fitting being disclosed in copending U.S. application Serial No. 440,761 and now Patent No. 3,333,871 and United States Patents Nos. 2,871,738 and 3,106,758. Briefly, such fittings comprise a body 23 having a tubular nipple 22 forming an integral part of the body, insertable into a cut end of the conduit 20 and clamped thereto by an appropriate clamp device 24, such as is described in detail in the above-mentioned patents. To further protect the cut end of the conduit 20, the free end thereof is desirably protected by an annular shield or end cap 26 engaged in a radial groove 28 defined on the fiitting adjacent the nipple 22 and cemented to the conduit 20, and the entire clamp assembly enclosed within a protective sleeve 25. More specifically, this radial groove is defined on one side by a ridge or annular portion 29 integral with the body 22, and on the other side by an annular surface or shoulder 30, on a radially extending rib integral with the body and defining opposed shoulders 30, 31. While a specific body and clamp assembly has been shown in the drawing, it will be appreciated, of course, that any appropriate clamp device can be employed for attaching a fitting embodying the present invention to a flexible or rigid conduit.

For providing a swiveling action between the conduit 20 and a device or nozzle to which the threaded head 21 is attached, means are provided affording a swiveling connection between the fitting body 23 and the head 21. To this end the body 23 is provided at the end thereof opposite from the end to be inserted into the conduit, with an elongated, smoothly-surfaced, integral tubular portion 32 extending axially from the annular shoulder 31 defined on the body. At its free end, the said tubular portion is formed with a radial clamp receiving groove 34. Internally, the body 23 defines a continuous bore of a diameter approximately equal to that of the inside diameter of the conduit 20. The external surface of the tubular portion 32 of the body 23 is smoothly finished so as to provide a snug but rotative fit with a similarly smoothly-finished, internal surface or bore 35 defined within the head 21. To afford a complete sealing action between the tubular portion 32 of the body 23 and the bore 35 within the threaded head 21, the bore 35 of the threaded head 21 is provided, at a point internally adjacent the end thereof remote from the external threads 36, with one or more spaced radial grooves 38, each containing an O-ring 40, adapted to be seated snugly within the groove and sealingly engage the smooth external surface of the tubular portion 32. To lubricate the seal, the grooves 38, are filled with a lubricant, such as a silicone grease. The O-rings, afford an effective seal and yet allow the conduit and body to swivel with respect to the threaded head 21. The threaded head 21 is held on the tubular portion 32 of the body 23 by means of a "C" or snap ring 42, snapped within the groove 34 and abutting the threaded end of the head 21. The threaded head 21 is desirably provided with appropriate wrench pads 44 for use when mounting the swivel fitting on a pump, or other fixture such as a nozzle.

The coextensive surfaces of the threaded head 21 and tubular portion 32 are designed to be of a sufficient length to insure an efficient, long wearing bearing surface, and the O-rings insure that such fluids will not leak between the threaded head 21 and the tubular portion 32 and shoulder 31. It will be observed that the diameter of the fittings is not increased, over a non-swiveling fitting, or increased only in an extremely small amount, so as to provide a compact fitting. Similarly, as the tubular portion 32 of the body 23 does not extend appreciably beyond the threaded portion of the threaded head 21, the overall length of the fitting is kept to a minimum after installation.

While a certain illustrative embodiment of the invention has been shown and described, it should be understood that there is no intention to limit the invention to the specific form disclosed, but on the contrary, the intention is to cover all the forms, modifications, alternative constructions, equivalents and uses falling within the spirit and scope of the appended claim.

I claim:

1. In a conduit fitting having a tubular body portion, means on one end of said body portion for attaching said fitting to a second fitting, means defining an annular ridge on said tubular body portion adjacent said attaching means, said ridge having an annular shoulder facing away from said attaching means, said body portion having a smoothly-cylindrical elongated external surface at the side of said shoulder remote from said attaching means, a head formed with smooth, axially-perpendicular end areas snugly and rotatively mounted on said body portion and having an internal surface substantially coextensive save as to relatively slightly reduced length with said smooth external surface of said body portion, said head having attaching means thereon for engagement with a third fitting, the improvement which comprises means defining an annular groove interrupting said smooth external surface of said body portion inwardly adjacent the free end thereof in exposure at the proximate end of said head, a snap ring removably and replaceably received in said groove as an end stop for said head inhibitive of axial displacement of the latter relative to said body portion and shoulder, means defining a pair of spacedly-contiguous, lubricant-charged grooves internally annular of said head adjacent the inner end thereof, and an O-ring seated in each said latter grooves in moderate pressure engagement with the opposed surface of said tubular portion, whereby in an organization amenable to facile assembly and disassembly functional distortion of the readily-replaceable O-rings effects a sealed swivel connection between said head and said tubular body portion enhanced by consequent maintenance of a lubricant supplement filling the body and head clearance space between adjacent O-rings.

References Cited

UNITED STATES PATENTS

| | | | |
|---|---|---|---|
| 2,481,404 | 9/1949 | Donner | 285—94 X |
| 2,810,592 | 10/1957 | Williams | 285—94 X |
| 2,430,921 | 11/1947 | Edelmann | 285—272 X |
| 2,443,394 | 6/1948 | LeClair | 285—388 |

FOREIGN PATENTS

| | | |
|---|---|---|
| 1,054,295 | 4/1959 | Germany. |
| 91,540 | 4/1958 | Norway. |

EDWARD C. ALLEN, *Primary Examiner.*

CARL W. TOMLIN, THOMAS F. CALLAGHAN,
*Examiners.*